Patented Nov. 3, 1942

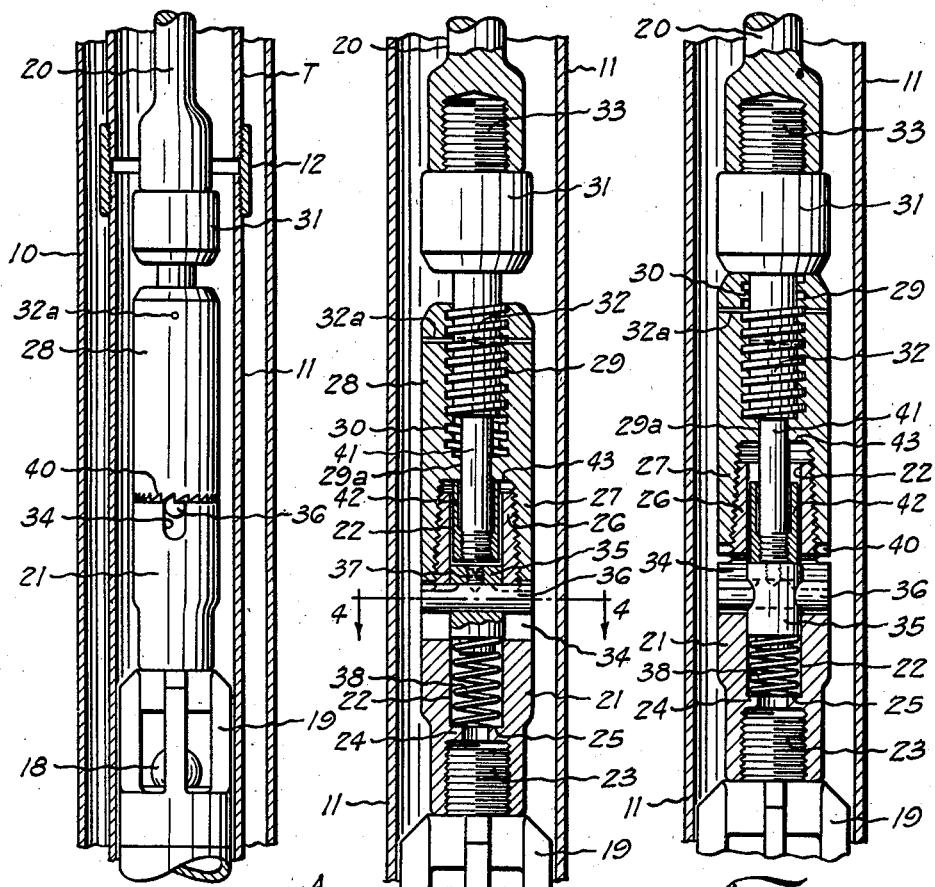

2,300,711

UNITED STATES PATENT OFFICE 2,300,711

COUPLING

Otto Staerker, Gladewater, Tex.

Application May 19, 1941, Serial No. 394,151

14 Claims. (Cl. 287—125)

This invention relates to new and useful improvements in couplings.

One object of the invention is to provide a coupling which is an improvement on my copending application, Serial No. 214,414, filed June 18, 1938, and which is particularly adapted for use in connecting well pumping rods with a pump plunger, valve, or other member.

An important object of the invention is to provide an improved coupling arranged to connect the usual pump rods with a pump plunger and constructed to securely fasten the parts together and prevent accidental disconnection, whereby normal pumping operation may be performed; the coupling having means to permit disconnection of the rods from the plunger if for any reason, it is desired or necessary to remove the rods, as for example, if the plunger becomes stuck in the working barrel.

A particular object of the invention is to provide an improved coupling wherein left-hand threads are employed for connecting the pump rods to the plunger, together with a latching means which normally prevents rotation of uncoupling of said left-hand threads, whereby the latching means must be actuated before disconnection may be accomplished; the coupling also providing improved means for operating the latching means.

A particular object of the invention is to provide an improved coupling, of the character described, which is adaptable for use in connecting elements within a well bore, said coupling being normally locked against disconnection and being arranged so that it may be unlocked and uncoupled from the surface and without removing the same from the well bore.

Another object of the invention is to provide an improved coupling, of the character described, wherein the operating means for effecting release of the latch is normally locked against actuation by frangible means, such as a shear pin, whereby accidental or unintentional actuation of this operating means is prevented.

A further object of the invention is to provide an improved coupling, of the character described, having a left-hand thread connection between said coupling and the pump plunger and a right-hand thread connection between the coupling and the rods, together with a latch for normally preventing unscrewing of said left-hand connection; the coupling also having a right-hand thread arrangement for controlling the operation of the means for releasing the latch, whereby the latch may be released and the coupling disconnected from the plunger without disturbing or disconnecting any of the usual right-hand connections in the pump rods.

The construction designed to carry out the invention will be hereinafter described together with other features of the invention.

The invention will be more readily understood from a reading of the following specification and by reference to the accompanying drawing, as an example of the invention is shown, and wherein:

Figure 1 is an elevation of a coupling, constructed in accordance with the invention, and showing the same connecting the pump rods with a pump plunger, the working barrel and casing being in section, Figure 2 is a transverse, vertical, sectional view of the coupling with the latch in its locked position, Figure 3 is a similar view, with the latch released, Figure 4 is a horizontal, cross-sectional view, taken on the line 4—4 of Figure 2, and Figure 5 is an isometric view of the latch pin.

In the drawing, the numeral 10 designates a well casing of the usual construction, which has the ordinary well tubing T extending axially therethrough. A working barrel 11 having substantially the same diameter as the tubing T, is connected to the lower end of said tubing by means of an ordinary coupling 12 and the lower end of said working barrel is connected by a collar 13 with the usual well screen 14. A standing valve 15 is mounted between the ends of the working barrel 11 and the screen 14 and is arranged to permit an upward flow through the working barrel, while preventing a downward flow therethrough in the usual manner.

A pump plunger A is movable vertically within the working barrel 11 and includes a tubular mandrel 16 having the usual packing elements 17 thereon. A travelling valve 18 of ordinary construction, is located within a cage 19 which is secured to the upper end of the mandrel 16. As the pump plunger A reciprocates within the working barrel, fluid is drawn upwardly past the standing valve 15 and then flows upwardly through the mandrel 16, past the valve 18 and finally into the tubing T above the working barrel 11. The valves 15 and 18 operate in the usual manner.

The pump plunger A is carried by the usual pump rods 20 which extend downwardly through the tubing T and which have their lower ends connected to the plunger. As the pump rods are reciprocated within the tubing, the plunger is moved vertically within the working barrel to perform the pumping operation.

For connecting and disconnecting the rods with the pump plunger, a coupling element which includes a lower member or sleeve 21 is provided. The sleeve is formed with an axial bore 22 which extends therethrough and the lower end of said bore is internally screw-threaded so as to receive an upstanding axial pin 23 which is provided on the traveling valve cage 19. An internal, annular flange 24 is preferably formed integral with the sleeve and extends inwardly of the bore immediately above the screw-threaded portion, whereby an internal shoulder 25 is formed within the lower portion of the bore 22 of said sleeve. An upwardly extending pin 26 is provided at the upper end of the sleeve 21 and this pin has external, left-hand screw threads thereon. The pin is adapted to engage within the lower end of a box 27 which is formed integral with the upper element or collar 28 of the coupling, whereby the collar and the sleeve may be readily connected. As will be explained, the collar 28 which forms the upper element of the coupling is connected to the rods 20. With this arrangement, the upper element of the coupling is connected with the rods 20, while the lower member or sleeve 21 of the coupling is connected to the plunger, the collar 28 and the sleeve 21 being connected to each other by the left-hand threads of the pin 26 and the box 27. Since the threads of said pin and box are left-hand threads, the two parts of the coupling may be separated or disconnected without disconnecting the sleeve 21 from the pin 23 of the cage 19, as the latter employs the usual right-hand threads. Also, the collar 28 may be disconnected from the sleeve 21 without disconnecting any of the other right-hand thread connections in the pump rods 20.

For connecting the upper element or collar 28 to the pump rods, said collar is formed with an axial bore 29 which is formed with coarse, right-hand screw threads 30. A coupler 31 has a depending shank 32 which is formed with complementary right-hand threads, whereby a connection between the coupler 31 and the collar 28 may be had. The upper end of the coupler 31 is formed with an upstanding pin 33 which receives the lowermost rod 20 of the pump rods and in this manner, the coupler 31 serves to connect the lower end of the rods to the collar 28. Normally, the parts are in the position shown in Figure 2 and a rotation of the coupler 31 with reference to the collar 28 is prevented by a diametrically extending shear pin 32a which extends through the collar and through the shank 32. In this position, the shank 32 is within the upper portion of the bore 29 and is held so by the shear pin. In order to permit a downward movement of the shank within the bore, it is necessary that the shear pin 32a be broken and when this occurs, a rotation may be imparted to the shank 32 by means of the rods 20 so as to screw said shank downwardly within the bore 22.

For preventing the accidental unscrewing of the collar 28 from the pin 26 of the sleeve 21, said sleeve is formed with radial slots or openings 34 which are located in the upper end of the bore 22 adjacent the base of the pin 26. A cylindrical block 35 is slidable within the bore 22 and a transversely extending latch pin 36 extends diametrically through the block 35, said pin being secured therein by means of a suitable set screw 37. The extremities of the latch pin 36 are movable within the radial slots 34 of the sleeve. A coiled spring 38 is disposed between the lower end of the block 35 and the internal shoulder 25 at the lower end of the bore 22 and this spring exerts its pressure to constantly urge the block 35 and latch pin 36 upwardly, whereby the latch pin is normally held at the upper end of the radial slots 34.

Each end portion of the latch pin 36 is formed with an elongate recess 39, which is angular in cross-section, as is clearly shown in Figure 5. When the box 27 of the collar 28 is threaded onto the pin 26 at the upper end of the sleeve 21, the lower ends of the box 27 abut the upper end of the sleeve 21 contiguous to the base of the pin 26. This lower edge of the box 27 is formed with a plurality of ratchet teeth or serrations 40 and said teeth are adapted to engage within the angular recesses 39 of the latch pin 36. As is clearly shown in Figures 1 and 2, each recess 39 in the latch pin engages one of the ratchet teeth 40 when the collar 28 is coupled to the sleeve 21. The teeth 40 are so constructed that they permit a rotation of the collar 28 with relation to the sleeve 21 in a direction to permit tightening of the pin 26 within the box 27; however, after the connection is made, the engagement of the recesses 39 in the latch pin with the teeth 40 which are received therein, prevent rotation of the parts in a reverse direction. Therefore, after the connection is made, it is impossible to disconnect the collar 28 from the sleeve 21 until the latch pin 36 has been depressed so as to disengage its recesses from the ratchet teeth 40. This provides a positive means for locking the parts together and preventing the accidental or unintentional unscrewing thereof.

For effecting a depression of the block 35 so as to move the latch pin downwardly and disengage its recesses 39 from the ratchet teeth 40, the threaded shank 32 is formed with a depending stem or plunger 41 which extends downwardly through a reduced portion 29a of the bore 29 of the collar 28. The lower end of the plunger 41 extends into the upper end of the bore 22 of the sleeve and has a collar 42 secured thereon. The upper edge of this collar is adapted to abut the internal shoulder 43 which is formed within the bore 29 by the reduced portion 29a, whereby upward movement of the plunger 41, as well as upward movement of the shank 32, is limited.

In the operation of the device, the parts are connected as shown in Figures 1 and 2. In such position, the sleeve 21 has been coupled to the collar 28 and the latch pin 36 is engaged with certain of the ratchet teeth 40. The rods 20 are connected to the collar 28 by the shank 32 which is disposed within the upper portion of the bore 29 of the collar 28, being held in such position by means of the shear pin 32a. The rods and plunger are, of course, lowered downwardly through the tubing so that the plunger is disposed within the working barrel, after which the rods are reciprocated to reciprocate the plunger to perform the pumping operation. So long as a normal pumping operation is being carried out, there is no change in the position of any of the parts, the elements 21, 28 and 31 merely serving as a connection between the pump rods 20 and the plunger A.

In the event that the plunger A should become sanded up, or for any reason, should become wedged or stuck within the working barrel, it is desirable, and substantially essential, that the rods 20 be removed from the tubing independently of the plunger. When such a condition arises, it is only necessary to rotate the rods 20 in a direction to tighten the right-hand threads on the shank 32; in other words, the rods are rotated to the right, whereby all of the right-hand connections in the pump rods 20 are tightened, and also, whereby a downward tightening movement is imparted to the shank 32. Such a rotation of the rods 20 and of the shank will result in fracturing or shearing of the pin 32a, after which continued rotation of the rods moves the shank 32 of the coupler 31 downwardly to the lower end of the bore 29 of the collar 28, which is the position shown in Figure 3.

Such downward movement of the shank 32, results in a downward movement of the stem or plunger 41, whereby the lower end of said plunger is moved into engagement with the spring-pressed block 35 to depress said block within the bore 22 of the sleeve 21. The depression of the block 35 moves the pin 36 downwardly so as to disengage the ratchet teeth 40 from the recesses 39 in said latch pin. After the shank 32 moves to the bottom of the bore 29, at which point the base of the coupler 31 strikes the upper end of the collar 28 (Figure 3) to prevent further downward movement of the shank 32 and plunger 41, disengagement of the latch pin from the ratchet teeth is complete and a continued rotation of the rods to the right will result in an unscrewing of the left-hand threads on the pin 26 of the sleeve and the box 27 of the collar. Obviously, continued rotation will result in a complete disconnection of the collar 28 from the sleeve 21, whereby the rods 20 may be removed from the tubing independently of the plunger A.

The device comprises a simple and inexpensive coupling which normally functions as any other coupling for connecting the rods with the pump plunger. In the event any condition arises whereby the pump plunger becomes sanded up, or for any other reason becomes wedged or stuck within the working barrel, then it is only necessary to rotate the rods in a direction to tighten a right-hand screw thread. Such rotation will result, first, in a depression of the latch pin 36 and then in an uncoupling of the left-hand screw threads on the pin 26 and the box 27. Of course, after the rods 20 are removed from the well, any suitable means may be employed for removing the plunger A.

What I claim and desire to secure by Letters Patent is:

1. A coupling including, a collar having a threaded bore and arranged to be attached to one of the elements to be coupled, a coupling member carried by the other element to be coupled and adapted to be screwed into the collar, means for latching the collar and member to each other to prevent accidental disconnection of these parts, and rotatable actuating means mounted within the collar and arranged to be operated by a rotation of the element to which said collar is attached so as to effect release of said latching means to allow uncoupling of said collar and member.

2. A coupling including, a collar having a threaded bore and arranged to be attached to one of the elements to be coupled, a coupling member carried by the other element to be coupled and adapted to be screwed into the collar, means for latching the collar and member to each other to prevent accidental disconnection of these parts, and releasing means operated by a rotation of the element to which the collar is coupled for effecting a release of the latching means, whereby uncoupling of the collar and member may be accomplished.

3. A coupling including, a collar having a threaded bore and arranged to be attached to one of the elements to be coupled, a coupling member carried by the other element to be coupled and adapted to be screwed into the collar, co-acting means on the collar and member for preventing unintentional disconnection of these parts, and releasing means actuated by a rotation of the element to which the collar is coupled for effecting a release of said co-acting means to permit uncoupling of the collar and member.

4. A coupling including, a collar having a threaded bore and arranged to be attached to one of the elements to be coupled, a coupling member carried by the other element to be coupled and adapted to be screwed into the collar, a plurality of serrations on the collar, spring-pressed means carried by the member and adapted to engage the serrations when the parts are coupled to prevent unintentional disconnection thereof, and rotatable actuating means mounted within the collar and arranged to be operated by a rotation of the element to which said collar is attached to actuate said spring-pressed means so as to disengage the same from the serrations, whereby uncoupling of the collar and member may be accomplished.

5. A coupling including, a collar having a threaded bore and arranged to be attached to one of the elements to be coupled, a coupling member carried by the other element to be coupled and adapted to be screwed into the collar, a plurality of serrations on the collar, spring-pressed means carried by the member and adapted to engage the serrations when the parts are coupled to prevent unintentional disconnection thereof, and releasing means operated by a rotation of the element to which the collar is coupled for engaging and effecting a release of the spring-pressed means from the serrations, whereby the collar and coupling may be disconnected.

6. A coupling including, a collar having a threaded bore and arranged to be attached to one of the elements to be coupled, a coupling member carried by the other element to be coupled and adapted to be screwed into the collar, means for latching the collar and member to each other to prevent accidental disconnection of these parts, releasing means operated by a rotation of the element to which the collar is coupled for effecting a release of the latching means, whereby uncoupling of the collar and member may be accomplished, and frangible means for normally locking the releasing means against operation.

7. A coupling including, a collar having a threaded bore and arranged to be attached to one of the elements to be coupled, a coupling member carried by the other element to be coupled and adapted to be screwed into the collar, a plurality of serrations on the collar, spring-pressed means carried by the member and adapted to engage the serrations when the parts are coupled to prevent unintentional disconnection thereof, releasing means operated by a rotation of the element to which the collar is coupled for engaging and effecting a release of the spring-pressed means from the serrations, whereby the collar and coupling may be disconnected, and frangible means for normally locking the releasing means against operation.

8. A coupling including, a lower coupling member having a connecting pin provided with left-hand threads, a collar arranged to receive the pin, spring-pressed means carried by the lower member and engageable with the collar for preventing unintentional disconnection of the collar from said member, said collar having a bore provided with right-hand threads, a coupler having a depending shank threaded into said bore, whereby rotation of said shank within the bore moves said shank axially of the collar and also of the member, and a plunger extending downwardly from said shank and adapted to engage the spring-pressed means when the shank is rotated and screwed downwardly within the collar, whereby said spring-pressed means is depressed and disengaged from the collar to permit uncoupling of the collar and member.

9. A coupling including, a lower coupling member having a connecting pin provided with left-hand threads, a collar arranged to receive the pin, spring-pressed means carried by the lower member and engageable with the collar for preventing unintentional disconnection of the collar from said member, said collar having a bore provided with right-hand threads, a coupler having a depending shank threaded into said bore, whereby rotation of said shank within the bore moves said shank axially of the collar and also of the member, a plunger extending downwardly from said shank and adapted to engage the spring-pressed means when the shank is rotated and screwed downwardly within the collar, whereby said spring-pressed means is depressed and disengaged from the collar to permit uncoupling of the collar and member, and frangible means for normally locking the shank within the bore in a position with the plunger above and out of contact with the spring-pressed means.

10. A coupling including, a lower coupling member having a connecting pin provided with left-hand threads, a collar arranged to receive the pin, spring-pressed means carried by the lower member and engageable with the collar for preventing unintentional disconnection of the collar from said member, said collar having a bore provided with right-hand threads, a coupler having a depending shank threaded into said bore, whereby rotation of said shank within the bore moves said shank axially of the collar and also of the member, a plunger extending downwardly from said shank and adapted to engage the spring-pressed means when the shank is rotated and screwed downwardly within the collar, whereby said spring-pressed means is depressed and disengaged from the collar to permit uncoupling of the collar and member, the shank being normally within the upper portion of the bore of the collar whereby the plunger is disengaged from the spring-pressed means, and a frangible pin locking the shank against rotation within the collar in such position, whereby said pin must be ruptured before downward movement of the plunger and release of the spring-pressed means may be effected.

11. The combination with a pump plunger and pump rods for reciprocating the same of a coupling including, a coupling member attached to the plunger, a complementary member connected to the rods and adapted to be connected to the first coupling member by left-hand threads, spring-pressed means carried by one member and adapted to engage the other member when the members are coupled for preventing unintentional disconnection thereof, and releasing means operated by a rotation of the pump rods for effecting a release of the spring-pressed means, whereby continued rotation results in an uncoupling of the left-hand threads of the two members.

12. The combination with a pump plunger and pump rods for reciprocating the same of a coupling including, a coupling member attached to the plunger, a complementary member connected to the rods and adapted to be connected to the first coupling member by left-hand threads, spring-pressed means carried by one member and adapted to engage the other member when the members are coupled for preventing unintentional disconnection thereof, releasing means operated by a rotation of the pump rods for effecting a release of the spring-pressed means, whereby continued rotation results in an uncoupling of the left-hand threads of the two members, and frangible means for locking the releasing means against accidental operation.

13. A coupling including, a collar having a threaded bore and arranged to be attached to one of the elements to be coupled, a coupling member carried by the other element to be coupled and adapted to be screwed into the collar, said elements, collar and coupling member being arranged to be lowered into a well bore, a plurality of serrations on the collar, spring-pressed means carried by the member and adapted to engage the serrations when the parts are coupled to prevent unintentional disconnection thereof, and rotatable actuating means mounted within the collar and arranged to disengage said spring-pressed means so as to disengage the same from the serrations, whereby uncoupling of the collar and member may be accomplished, said actuating means being operable from the surface of the ground and adapted to be operated by a rotation of the element to which the collar is attached, whereby uncoupling may be effected without removing the coupling from the well bore.

14. The combination with a pump plunger and pump rods for reciprocating the same of a coupling including, a coupling member attached to the plunger, a complementary member connected to the rods and adapted to be connected to the first coupling member by left-hand threads, spring-pressed means carried by one member and adapted to engage the other member when the members are coupled for preventing unintentional disconnection thereof, and rotatable releasing means operable from the surface of the well and arranged to be operated by a rotation of the latter member for effecting a release of the spring-pressed means, whereby continued rotation results in an uncoupling of the left-hand threads of the two members to permit disconnection without removing the coupling from the well.

OTTO STAERKER.